(12) United States Patent
Forsgren

(10) Patent No.: US 12,128,275 B2
(45) Date of Patent: *Oct. 29, 2024

(54) SYSTEM AND METHOD FOR THREE DIMENSIONAL OBJECT TRACKING USING COMBINATION OF RADAR AND IMAGE DATA

(71) Applicant: Topgolf Sweden AB, Danderyd (SE)

(72) Inventor: Daniel Forsgren, Enebyberg (SE)

(73) Assignee: Topgolf Sweden AB (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/323,938

(22) Filed: May 25, 2023

(65) Prior Publication Data

US 2023/0293940 A1 Sep. 21, 2023

Related U.S. Application Data

(63) Continuation of application No. 16/825,853, filed on Mar. 20, 2020, which is a continuation of application
(Continued)

(51) Int. Cl.
*A63B 24/00* (2006.01)
*A63B 57/00* (2015.01)
(Continued)

(52) U.S. Cl.
CPC .......... *A63B 24/0021* (2013.01); *A63B 57/00* (2013.01); *G01S 13/587* (2013.01);
(Continued)

(58) Field of Classification Search
CPC ........ H04N 7/188; G01S 13/58; G01S 13/867
See application file for complete search history.

(56) References Cited

U.S. PATENT DOCUMENTS

| 4,673,183 A | 6/1987 | Trahan |
| 5,342,051 A | 8/1994 | Rankin et al. |

(Continued)

FOREIGN PATENT DOCUMENTS

| WO | WO 1997028856 | 8/1997 |
| WO | WO 2003104838 | 12/2003 |
| WO | WO 2010086414 | 8/2010 |

OTHER PUBLICATIONS

ErnestSports.com [online] "Ernest sports ES16 user manual", [retrieved on Jan. 25, 2017] retrieved from: http://www.ernestsports.com/ES16UserManualWeb.pdf, 28 pages.
(Continued)

*Primary Examiner* — Reginald A Renwick
(74) *Attorney, Agent, or Firm* — Fish & Richardson P.C.

(57) ABSTRACT

Methods, systems, and apparatus, including medium-encoded computer program products, for 3D flight tracking of objects includes, in at least one aspect, a method including obtaining (from a camera) two dimensional image data of a golf ball in flight; obtaining radar data (originating from a Doppler radar device) of the golf ball in flight; fitting a curve to the radar data to generate a continuous function of time for the radar data of the golf ball in flight; determining three dimensional location information of the golf ball in three dimensional space including, for each of multiple camera observations, finding a radial distance using the continuous function and a time of the camera observation, finding a depth distance, finding a horizontal distance and finding a vertical distance to the golf ball; and providing the three dimensional location information of the golf ball in three dimensional space to augment other data before display.

25 Claims, 4 Drawing Sheets

Related U.S. Application Data

No. 16/033,134, filed on Jul. 11, 2018, now Pat. No. 10,596,416, which is a continuation of application No. PCT/IB2018/050573, filed on Jan. 30, 2018.

(60) Provisional application No. 62/452,295, filed on Jan. 30, 2017.

(51) Int. Cl.
  *A63B 69/36* (2006.01)
  *G01S 13/58* (2006.01)
  *G01S 13/72* (2006.01)
  *G01S 13/86* (2006.01)
  *G01S 13/88* (2006.01)

(52) U.S. Cl.
  CPC ............ *G01S 13/72* (2013.01); *G01S 13/867* (2013.01); *G01S 13/88* (2013.01); *A63B 2024/0034* (2013.01); *A63B 69/3658* (2013.01); *A63B 2220/89* (2013.01)

(56) References Cited

U.S. PATENT DOCUMENTS

| | | | |
|---|---|---|---|
| 5,413,345 | A | 5/1995 | Nauck |
| 5,489,099 | A | 2/1996 | Rankin et al. |
| 5,912,700 | A | 6/1999 | Honey et al. |
| 5,938,545 | A | 8/1999 | Cooper et al. |
| 5,953,056 | A | 9/1999 | Tucker |
| 6,233,007 | B1 | 5/2001 | Carlbom et al. |
| 6,236,940 | B1 | 5/2001 | Rudow et al. |
| 6,320,173 | B1 | 11/2001 | Vock et al. |
| 6,449,010 | B1 | 9/2002 | Tucker |
| 6,520,864 | B1 | 2/2003 | Wilk |
| 7,497,780 | B2 | 3/2009 | Kiraly |
| 7,843,510 | B1 | 11/2010 | Ayer et al. |
| 8,077,917 | B2 | 12/2011 | Forsgren |
| 10,315,093 | B2 | 6/2019 | Tuxen |
| 2003/0027655 | A1 | 2/2003 | Lutz et al. |
| 2003/0103648 | A1 | 6/2003 | Ito et al. |
| 2004/0136592 | A1 | 7/2004 | Chen et al. |
| 2004/0258154 | A1 | 12/2004 | Liu et al. |
| 2005/0040710 | A1 | 2/2005 | Ahn et al. |
| 2006/0008116 | A1 | 1/2006 | Kiraly et al. |
| 2007/0105637 | A1 | 5/2007 | Shimizu |
| 2007/0167247 | A1 | 7/2007 | Lindsay |
| 2007/0293331 | A1 | 12/2007 | Tuxen |
| 2007/0298897 | A1 | 12/2007 | Kiraly |
| 2008/0139330 | A1 | 6/2008 | Tuxen |
| 2008/0175441 | A1 | 7/2008 | Nobuyuki et al. |
| 2008/0199043 | A1 | 8/2008 | Forsgren |
| 2009/0067670 | A1 | 3/2009 | Johnson et al. |
| 2009/0225845 | A1 | 9/2009 | Veremeev et al. |
| 2009/0245571 | A1 | 10/2009 | Chien et al. |
| 2009/0295624 | A1 | 12/2009 | Tuxen |
| 2010/0029415 | A1 | 2/2010 | Lindsay |
| 2010/0041498 | A1 | 2/2010 | Adams |
| 2011/0159976 | A2 | 6/2011 | Hohla et al. |
| 2011/0246069 | A1 | 10/2011 | Peres et al. |
| 2011/0286632 | A1 | 11/2011 | Tuxen et al. |
| 2012/0068879 | A1 | 3/2012 | Tuxen |
| 2013/0274025 | A1 | 10/2013 | Luciano et al. |
| 2014/0191896 | A1 | 7/2014 | Johnson et al. |
| 2014/0206479 | A1 | 7/2014 | Marty et al. |
| 2014/0228139 | A1 | 8/2014 | Wilson et al. |
| 2015/0262011 | A1 | 9/2015 | Keat et al. |
| 2016/0048975 | A9 | 2/2016 | Tuxen et al. |
| 2016/0059072 | A1 | 3/2016 | Volbrecht et al. |
| 2016/0074704 | A1 | 3/2016 | Volbrecht et al. |
| 2016/0170015 | A1 | 6/2016 | Tuxen |
| 2016/0217325 | A1 | 7/2016 | Bose et al. |
| 2016/0243423 | A1 | 8/2016 | Tuxen et al. |
| 2016/0247292 | A1 | 8/2016 | Tuxen et al. |
| 2016/0306036 | A1 | 10/2016 | Johnson |
| 2016/0307335 | A1 | 10/2016 | Perry |
| 2016/0313441 | A1 | 10/2016 | Tuxen |
| 2016/0320476 | A1 | 11/2016 | Johnson |
| 2016/0339320 | A1 | 11/2016 | Johnson |
| 2017/0054950 | A1 | 2/2017 | Yeo |
| 2017/0200277 | A1 | 7/2017 | Keat |
| 2018/0011183 | A1 | 1/2018 | Tuxen |
| 2018/0011184 | A1 | 1/2018 | Du Toit et al. |
| 2018/0120428 | A1 | 5/2018 | Tuxen et al. |
| 2018/0156914 | A1 | 6/2018 | Tuxen et al. |

OTHER PUBLICATIONS

ErnestSports.com [online] "Ernest sports golf launch monitors—ES16 tour," Jan. 2017 [retrieved on Jan. 25, 2017] retrieved from: http://www.ernestsports.com/es16-tour.html, 7 pages.

Hackaday.com [online] "Build a phased array radar in your garage that sees through walls," Apr. 7, 2015 [retrieved on Nov. 29, 2016] retrieved from: https://hackaday.com/2015/04/07/build-a-phased-array-radar-in-your-garage-that-sees-through-walls/, 22 pages.

Hackaday.com [online] "Try radar for your next project," Feb. 24, 2014 [retrieved on Nov. 29, 2016] retrieved from: https://hackaday.com/2014/02/24/guest-post-try-radar-for-your-next-project/, 23 pages.

International Application No. PCT/IB2018/050573, Notification of Transmittal of the International Search Report and the Written Opinion of the International Searching Authority, mailed May 16, 2018, 15 pages.

SYSTEM AND METHOD FOR THREE DIMENSIONAL OBJECT TRACKING USING COMBINATION OF RADAR AND IMAGE DATA

CROSS-REFERENCE TO RELATED APPLICATIONS

This application is a continuation application of U.S. patent application Ser. No. 16/825,853 filed Mar. 20, 2020, which is a continuation of and claims priority to U.S. patent application Ser. No. 16/033,134, filed Jul. 11, 2018, which is a continuation of and claims priority to International Application No. PCT/IB2018/050573, filed Jan. 30, 2018, which claims priority to U.S. Provisional Application Ser. No. 62/452,295, filed on Jan. 30, 2017.

BACKGROUND

This specification relates to tracking an object in flight, such as a golf ball, using data obtained from different image sensor technologies.

Systems and methods for tracking the flight of a golf shot with sensors include launch monitors, full flight two dimensional (2D) tracking, and full flight three dimensional (3D) tracking. Commonly used sensor types are cameras, Doppler radar, and phased array radar.

The launch monitor method is based on measuring a set of parameters that can be observed during the swing of the golf club and the first few inches of ball flight after the club has impacted the ball. The measured parameters are then used to extrapolate an expected ball flight using mathematics and physics modelling.

In contrast, full flight 3D tracking systems are characterized by a design that attempts to track the full flight of the golf shot, rather than extrapolating from launch parameters. In addition, full flight 2D tracking systems track the shape of a golf shot, as seen from a particular angle, but will not produce 3D information and generally cannot be used to determine key parameters, such as the distance the ball travelled.

SUMMARY

This specification describes technologies relating to tracking an object in flight, such as a golf ball, using data obtained from camera and radar sensor technologies, and more particularly to a full flight 3D tracking system that uses a combination of camera and Doppler radar data.

In general, one or more aspects of the subject matter described in this specification can be embodied in one or more methods that include obtaining two dimensional image data of a golf ball in flight, the two dimensional image data originating from a camera; obtaining radar data of the golf ball in flight, the radar data originating from a Doppler radar device associated with the camera; interpolating the radar data to generate interpolated radar data of the golf ball in flight; and blending radial distance information derived from the interpolated radar data of the golf ball in flight with angular distance information derived from the two dimensional image data of the golf ball in flight to form three dimensional location information of the golf ball in three dimensional space. Other embodiments of this aspect include corresponding systems, apparatus, and computer program products.

These and other embodiments can optionally include one or more of the following features. The interpolating can include fitting a curve to the radar data to extrapolate the radar data to a continuous function of time for the golf ball in flight, and the blending can include: for each of a plurality of camera observations of the golf ball in the two dimensional image data, finding a radial distance to the golf ball using the continuous function and a time of the camera observation, and calculating a three dimensional location of the golf ball in space using the radial distance and details of the camera observation. The calculating can include: multiplying the radial distance with a trigonometric calculation to find a depth distance to the golf ball, the trigonometric calculation being of an angle between a camera reference location in the two dimensional image data and an identified location of the golf ball in the two dimensional image data; and using linear algebra to find a horizontal distance and a vertical distance to the golf ball from the depth distance and the details of the camera observation including a horizontal offset between the camera reference location and the identified location of the golf ball, a vertical offset between the camera reference location and the identified location of the golf ball, and a focal length of the camera.

The continuous function can be a continuous radial speed function, and finding the radial distance can include integrating the continuous radial speed function from an initial time to a current time. The camera can have a predetermined frame rate. The radar data can include speed data but not distance data. Finding the radial distance can include: identifying a speed value from the continuous function in accordance with the time of the camera observation; multiplying the speed value by a time value corresponding to a frame time of the predetermined frame rate to obtain a distance value; and adding the distance value to a previously found radial distance of the golf ball.

An initial radial distance to the golf ball can be set in accordance with a predetermined starting point from which the golf ball is hit. Finding the radial distance can include determining an initial radial distance to the golf ball from a calculated distance to a golfer identified in the two dimensional image data from the camera. Identifying a speed value from the continuous function for camera observations after the first observation can include using the continuous function and a time equal to a time of a current camera observation minus half of the frame time. Identifying a speed value from the continuous function for camera observations after the first observation can include averaging a first speed value and a second speed value, the first speed value being calculated using the continuous function and a time of a current camera observation, and the second speed value being calculated using the continuous function and a time of a previous camera observation.

The predetermined frame rate can be programmable. Obtaining the radar data and fitting the curve to the radar data can be performed concurrently, and fitting the curve can include updating the curve fitting as more radar data of the golf ball in flight is received. In addition, the method can include: analyzing objects identified in the two dimensional image data to identify the plurality of camera observations of the golf ball; comparing the radar data with a criterion to identify a golf shot; signaling the golf shot being identified from the radar data; and adjusting one or more criteria used in the analyzing to favor selection of a set of object identifications that correspond to the golf shot to identify the plurality of camera observations of the golf ball.

In addition, one or more aspects of the subject matter described in this specification can be embodied in one or more systems that include a sensor unit including an object tracking camera and a Doppler radar device, which are aligned with each other and integrated into a shared sensor housing; and a computer including a hardware processor and a memory coupled with the hardware processor, the memory encoding instructions configured to cause the hardware processor to fit a curve to radar data originating from the Doppler radar device to extrapolate the radar data to a continuous function of time for a golf ball in flight, and the instructions configured to cause the hardware processor to, for each of a plurality of camera observations of the golf ball in two dimensional image data originating from the object tracking camera, find a radial distance to the golf ball using the continuous function and a time of the camera observation, and calculate a three dimensional location of the golf ball in space using the radial distance and details of the camera observation.

These and other embodiments can optionally include one or more of the following features. The Doppler radar device can be a single antenna Doppler radar device. The Doppler radar device can be configured to provide speed data but not distance data as the radar data. The system can include a broadcast camera to which the sensor unit is attached. Other system components can be design in accordance with the methods described herein. In addition, a computer program product, encoded on a computer-readable medium, can be operable to cause data processing apparatus to perform operations in accordance with any of the computer methods described herein.

Various embodiments of the subject matter described in this specification can be implemented to realize one or more of the following advantages. Accurate 3D object tracking can be achieved using a combination of camera and radar sensor technologies that is readily deployable. The camera and radar sensor technologies can be integrated together into a single sensor unit, thus simplifying the user experience since the radar-optical system becomes a single physical unit that can easily be moved around as one unit, i.e., the unit is treated as a single sensor. Further, the approach taken to combine data from the different sensor technologies facilitates the use of simpler radar technologies and miniaturization, thereby enabling reduced system costs while maintaining high accuracy in object tracking.

As compared with phased array radar 3D tracking systems, the use of a camera can provide higher angular resolution than radar phase shift analysis, allowing finer detail about the ball flight. The need for a multitude of radar antennas can be avoided in some implementations, allowing for a smaller product. In addition, in some implementations, the need for radar signal phase shift and phase shift analysis is avoided, reducing hardware complexity and cost.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
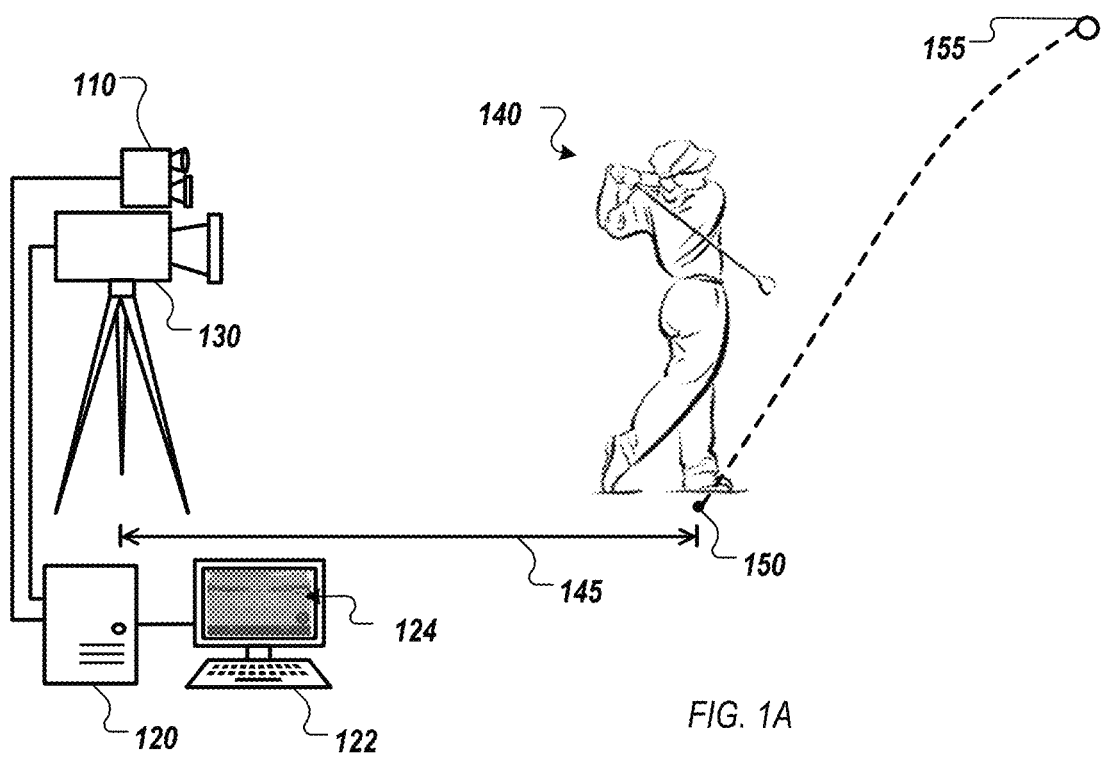
FIG. 1A shows an example of a system that performs 3D tracking of a golf ball in flight.

FIG. 1A shows an example of a system that performs 3D tracking of a golf ball in flight. The system includes a sensor unit 110 communicatively coupled with one or more server computers 120, one or more personal computers 122, or a combination of these. The sensor unit 110 includes both an object tracking camera and a Doppler radar device, which are aligned with each other and integrated into a shared sensor housing, as shown (note that the alignment need not be precise or in any way calibrated, in some implementations, since the radar device need not be used to determine any directional information, as described in further detail below). In addition, although represented using physical wires/cables in FIG. 1, it will be appreciated that the communicative coupling between the sensor unit 110 and the one or more computers 120, 122 can be implemented using wireless technologies, such as near field communications (NFC), Bluetooth, WiFi, and/or one or more mobile phone technologies.

In the example of FIG. 1, the sensor unit 110 is associated with an additional camera 130, and both the sensor unit 110 and the additional camera 130 are oriented toward a golfer 140 who has hit a golf ball 155 from a starting position 150 into a flight path in the direction of a hole. The additional camera 130 can be a television (TV) camera adapted to produce a signal for live transmission, or for recording. In some implementations, the sensor unit 110 is co-located with and mechanically affixed to the additional camera 130. In other implementations, the sensor unit 110 is in the same general area as the additional camera 130, but not specifically attached to it.

In some implementations, the distance 145 between the sensor unit 110 and the initial position 150 of the golf ball 155 is provided information (e.g., a predetermined starting point from which the golf ball 155 is known to be hit, or a distance parameter entered as input to one or more computers 120, 122). In some implementations, the distance 145 is determined automatically (e.g., by identifying the golfer 140 in image data using computerized object classification, calculating a distance to the identified golfer 140 using trigonometry and a known or presumed height of the golfer 140, and treating the distance to the golfer 140 as equal to the distance 145 to the initial position 150 of the golf ball 155). Note that the distance 145 can also be used to give a ball size criterion to assist in identifying the golf ball 150 in the image data generated by the sensor unit 110.

Moreover, the system can be designed to translate ball positions registered by the sensor unit 110 to corresponding positions in video data obtained by the additional camera 130, and using this translation, a graphical representation of the ball's flight path can be overlaid onto the video data for transmission and/or recording. This translation between the view of the camera of the sensor unit 110 and the additional camera 130 can be performed using well known homography techniques, such as are described in R. Hartley & A. Zisserman, Multiple View Geometry in Computer Vision, $2^{nd}$ Edition, Cambridge University Press, March 2004. Furthermore, in some implementations, the present systems and techniques are combined with the 2D ball flight tracking systems and techniques described in U.S. Pat. No. 8,077,917, issued on Dec. 13, 2011, and titled "SYSTEMS AND METHODS FOR ENHANCING IMAGES IN A VIDEO RECORDING OF A SPORTS EVENT", which patent is hereby incorporated by reference.

In other implementations, no additional camera 130 is included, and 3D ball positions determined using the sensor unit 110 can be used to augment other data or media. For example, the determined 3D ball positions can be used to generate a 3D representation of the ball's flight path within a 3D computer model 124 of an environment for the golf ball 155. This environment can be a representation of the actual, physical environment that the golfer 140 stands in (e.g., a particular hole on a particular golf course) or the environment can be a virtual environment that exists only in the computer model 124.

Figure 1B:
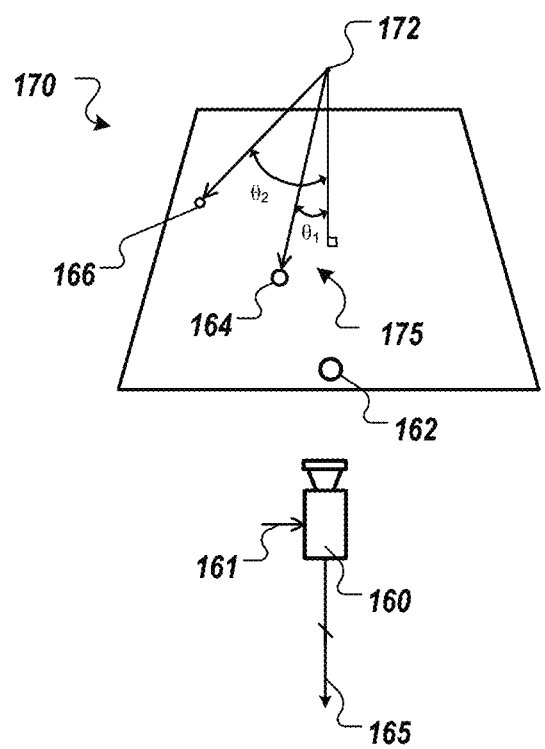
FIGS. 1B and 1C are diagrams representing 3D tracking of a golf ball in flight using both a camera and a Doppler radar device.
Figure 1C:
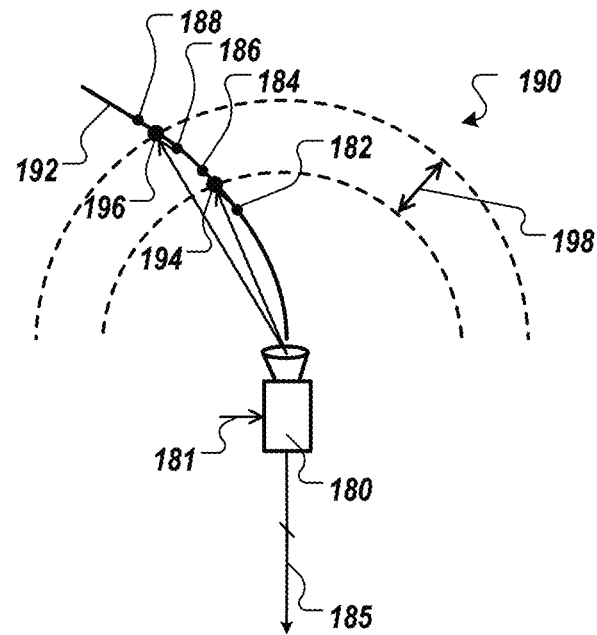

In any case, the object tracking camera and the Doppler radar device within the sensor unit 110 provide data which are combined using one or more computers 120, 122 to provide 3D flight tracking of the golf ball 155. FIG. 1B is a diagram representing an object tracking camera 160 (e.g., a single CMOS (Complementary Metal Oxide Semiconductor) based digital video camera) that produces 2D image data 165 (e.g., for 2D flight tracking of the golf ball 155). FIG. 1C is a diagram representing a Doppler radar device 180 (e.g., a single antenna Continuous Wave (CW) or chirped Doppler radar device) that produces radar data 185 of the golf ball 155 in flight, where the radar data 185 is used to supplement the 2D image data 165 to provide a complete 3D tracking system, which can do full flight 3D tracking of golf balls.

In some implementations, the camera 160 and the radar device 180 are attached to each other so that they both aim in roughly the same direction (e.g., the camera 160 and the radar device 180 can be aligned with each other and integrated into a common housing). In other implementations, the camera 160 and the radar device 180 are not attached to each other, and a specific orientation of the radar device 180 need not be required. For example, the location and aim of the camera 160 can be known (or determined from observation by the camera 160), and provided the relative location of the radar device 180 with respect to the camera 160 is known, then the data streams 165, 185 can be readily combined. Nonetheless, it should be noted that both the camera 160 and the radar device 180 are both aimed generally down the line of the expected golf shot so that each of the camera 160 and the radar device 180 contribute to full flight observation of the ball, in contrast with a launch monitor approach, where a camera is aimed toward the ball and perpendicular to the expected line of the golf shot (i.e., the camera only sees a small initial portion of the ball's flight).

Further, while co-location and alignment is not required, it should be noted that co-locating and aligning the radar device 180 and the camera 160, such that they have essentially the same location and orientation as each other, allows the system complexity to be reduced substantially since the camera 160 and the radar device 180 can be treated as a single sensor device in a single location that provides two different data streams 165, 185. In addition, the radar device 180 can be built so as to communicate its readings to the camera 160 (radar data 185 goes to camera 160, e.g., over a short serial cable), and the embedded circuitry in the camera 160 can be updated (e.g., by writing new firmware for the camera 160) to make those radar readings available over the same API (Application Programming Interface) and the same physical cable as the camera 160. This removes the need to have a second data path from the camera+radar unit 110, which can be a fairly big benefit in golf production where the sensor 110 may be deployed a mile or more from the TV production facilities (where the analyzing computer may be positioned).

The 2D image data 165 from the camera 160 is used to identify observations 162, 164, 166 of the golf ball in the 2D frame 170 of the camera 160. These observations include an initial observation 162 of the ball before it is hit, as well as in-flight observations 164, 166 of the ball after it has been hit. Note that only two in-flight observations are shown for ease of description, but in practice, there will be many in-flight observations of the ball as the optical sub-system tracks the 2D flight of the golf ball as seen by the camera 160 within the 2D frame 170. Subject to the frame rate (e.g., 30 frames per second, 60 frames per second, 120 frames per second, etc.) of the camera 160, the golf ball will typically be observed hundreds of times in the video stream 165 during the course of the 2D tracking for a single golf shot. In addition, in some implementations, the camera 160 includes one or more inputs 161 to receive settings and/or programming to configure the camera 160 for operations in a given system. For example, in some implementations, the camera has a predetermined frame rate, which is programmable through an input 161.

For the in-flight observations 164, 166, the 2D image data 165 is processed to determine angles 175 for the in-flight observations 164, 166. In this example, each of the angles 175 ($\theta_1$ and $\theta_2$) is the angle between the camera sensor center and the location of the ball observation on the camera sensor. Viewing the camera 160 using a theoretical pinhole model, the sensor area 170 is one part of the camera 160, but the camera also includes the virtual "pinhole" 172 (created by the lens of the camera 160) located one focal length in front of the sensor. All rays pass through the pinhole 172 before they hit the sensor, and the angles 175 are the angles (in 3D) between a particular ray of light and the reference perpendicular ray of light that passes through the pinhole 172 and hits the center of the sensor. Thus, the angle 175 is the angle between the "observation ray" associated with the in-flight observations 164, 166 and the center of the sensor area 170, in relation to the virtual pinhole 172 created by the camera lens (the focal length of the camera 160 is the distance from the sensor plane 170 to the pinhole 172).

Other angles can be used. The important point is that the 2D image tracking sub-system is used to determine angles to the ball observations, rather than using radar data to determine such angles. This allows the radar device 180 to be a much simpler device, including potentially a radar device that provides only speed information (note that a speed only radar device is typically less complex and less expensive than a radar device that provides distance information). In some implementations, the radar device 180 is a phased array radar device, but even in such cases, the phased array radar device 180 is not relied upon to accurately measure angles to the ball, which allows the radar device 180 to be miniaturized, and the antenna array (when used) need not have a certain width and height to be able to accurately measure angles. Since the angular resolution of the system is provided by the camera 160, fine detail regarding the shape of the ball flight can be readily detected without the use of a larger and/or more complicated radar device 180.

In some implementations, the radar device 180 is a single antenna radar device that only provides speed data 185 (e.g., a beat sensor that has no idea of angle or distance to the object). In some implementations, the radar device 180 is a Continuous Wave (CW) Doppler radar device. In some implementations, the radar device 180 provides distance data 185. In various implementations, the radar device 180 can be an impulse radar device, a Frequency Modulated Continuous Wave (FMCW) radar device, a phased array radar device, etc. In some implementations, the radar device 180 provides angular data 185 regarding the object.

In some implementations, the data 185 is collected from the radar device 180 by polling the radar 180 multiple times per second. In addition, the radar device 180 can include one or more inputs 181 to receive settings and/or programming to configure the radar device 180 for operations in a given system. For example, a setting can be entered in the radar device 180 through an input 181 such that the device 180 will report one speed reading per measurement. As another example, when the radar device 180 includes the capability of determining angles to the ball, the radar device 180 can be programmed through an input 181 so as to control the use of the angular information to aim the radar beams in the direction of an object being tracked. Note that even in such cases, the angles to the ball used for determining 3D positions will still be determined using the image data 165 since this data will provide better angular resolution.

The radar device 180 detects the flight of the ball by providing measurements 182, 184, 186, 188 of the ball as it flies through the space 190 in front of the radar device 180. As noted above, these measurements 182, 184, 186, 188 can include speed measurements or distance measurements. In either case, due to differences between the frame rate of the camera 160 and the measurement timing of the radar device 180, or because of gaps in the data 185 provided by the radar device 180, there will typically not be radar data available at exactly the same times as the camera observations 164, 166. To address this issue, interpolation techniques can be used on the measurements 182, 184, 186, 188 to find intermediate data points 194, 196 that match up with the camera observations 164, 166.

As will be appreciated, since the data points 194, 196 match up with the camera observations 164, 166, the time 198 between these data points 194, 196 is equal to the inverse of the predetermined frame rate of the camera 160, which facilitates the combining process for the two data streams 165, 185. In some implementations, curve fitting techniques are used to extrapolate the radar data 185 to a continuous function 192 of time for the object (e.g., the golf ball). By fitting a curve to the data, and potentially updating that curve fitting as additional data comes in, a radar measurement at any point in time can readily be obtained by plugging the time value into the continuous function 192.

Figure 2A:
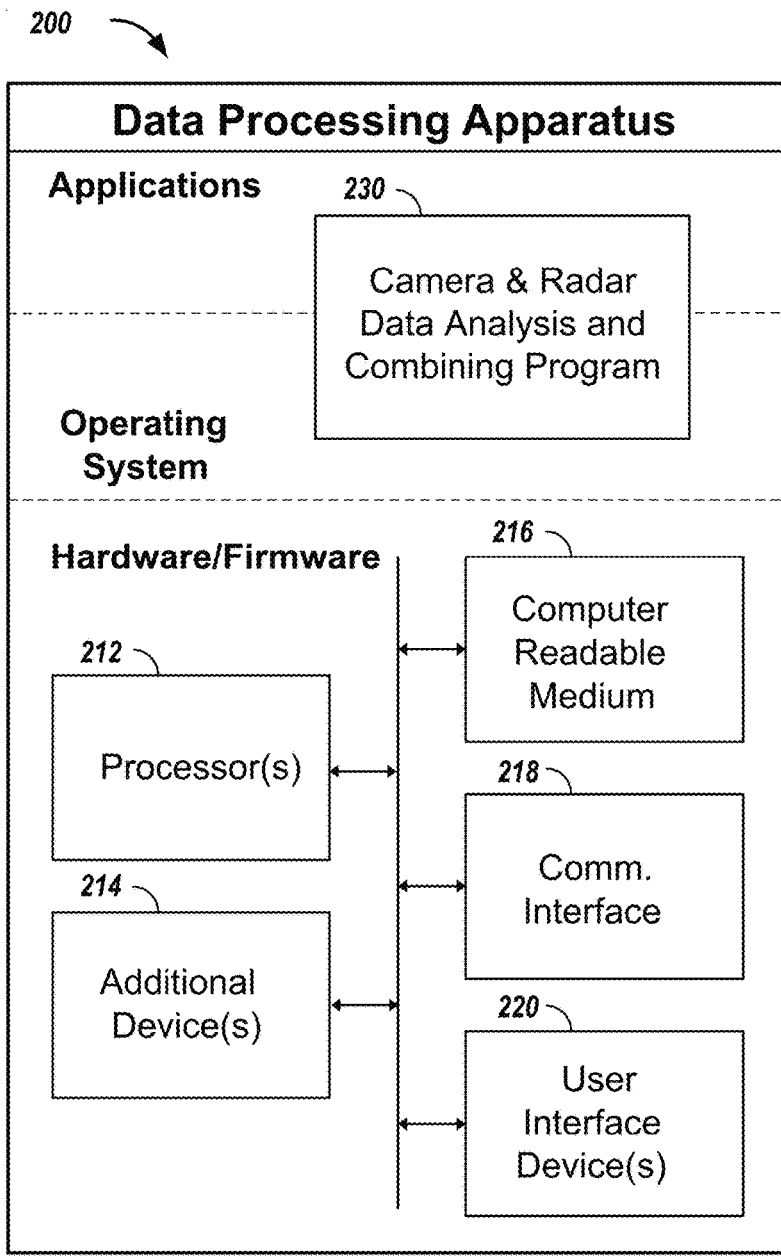
FIG. 2A is a schematic diagram of a data processing system.

FIG. 2A is a schematic diagram of a data processing system including a data processing apparatus 200, which can be programmed as a client or as a server. The data processing apparatus 200 is connected with one or more computers 290 through a network 280. While only one computer is shown in FIG. 2A as the data processing apparatus 200, multiple computers can be used. Thus, one or more of the computers 120, 122 from FIG. 1A can be implemented using data processing apparatus 200.

The data processing apparatus 200 includes various software modules, which can be distributed between an applications layer and an operating system. These can include executable and/or interpretable software programs or libraries, including a program 230 that operates as a 3D object flight tracking system in which camera and radar data are analyzed and combined, as described herein. The number of software modules used can vary from one implementation to another. Moreover, the software modules can be distributed on one or more data processing apparatus connected by one or more computer networks or other suitable communication networks.

The data processing apparatus 200 also includes hardware or firmware devices including one or more hardware processors 212, one or more additional devices 214, a computer readable medium 216, a communication interface 218, and one or more user interface devices 220. Each processor 212 is capable of processing instructions for execution within the data processing apparatus 200. In some implementations, the processor 212 is a single or multi-threaded processor. Each processor 212 is capable of processing instructions stored on the computer readable medium 216 or on a storage device such as one of the additional devices 214. The data processing apparatus 200 uses its communication interface 218 to communicate with one or more computers 290, for example, over a network 280. Thus, in various implementations, the processes described can be run in parallel or serially, on a single or multi-core computing machine, and/or on a computer cluster/cloud, etc.

Examples of user interface devices 220 include a display, a touchscreen display, a camera, a speaker, a microphone, a tactile feedback device, a keyboard, and a mouse. The data processing apparatus 200 can store instructions that implement operations associated with the modules described herein, for example, on the computer readable medium 216 or one or more additional devices 214, for example, one or more of a floppy disk device, a hard disk device, an optical disk device, a tape device, and a solid state memory device.

To obtain the radar and camera data, the data processing apparatus 200 includes one or more communication interfaces 218, such as interfaces for the wired or wireless technologies described above in connection with FIG. 1A. In some implementations, the data processing apparatus 200 also includes the camera 160 and the radar device 180 (e.g., integrated into a single housing 110), in which case, the camera 160 and the radar device 180 also form part of the structures used to obtain the radar and camera data. For example, in some implementations, a single apparatus 200 includes a single camera 160, a single antenna Doppler radar device 180, and a computer programmed to retrieve, analyze, interpolate (as needed), and blend the camera and radar data to form three dimensional location information of an object (e.g., a golf ball) in three dimensional space as it flies in front of the 3D flight tracking apparatus 200.

When the radar data provides only ball speed, the ball speed reported by the radar device will (because of the nature of the Doppler effect) not represent the actual speed of the ball through the air. Rather the radar data will correspond to the radial speed at which the ball distances itself from the radar device. Envision a circle at some distance R from the radar, and as the ball travels along the perimeter of that circle, the radar would report a radial speed of zero because the ball does not distance itself from the radar. However, if the ball travels on any other path, the distance from the radar will change, the speed at which this distance changes will be detected by the radar Doppler shift, and this radial speed will be reported by the radar.

Figure 2B:
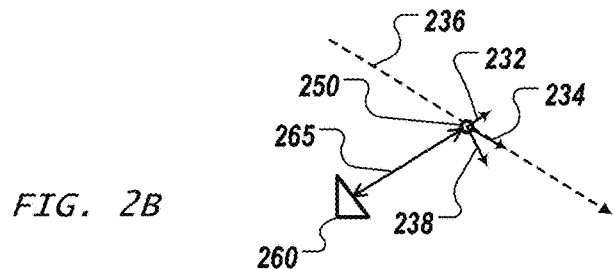
FIG. 2B is a diagram representing an example of radar data processing.

FIG. 2B is a diagram representing an example of radar data processing. The radar antenna 260 is a distance 265 away from a golf ball 250 at a certain time. The speed measurement obtained using the radar antenna 260 is the radial speed 232, but this is only the radial component of the speed 234 of the ball 250 along the ball trajectory 236. The speed measurement obtained using the radar antenna 260 does not include the tangential speed component 238. Since the time between each camera observation of the ball is known (it is determined by the camera frame rate, as discussed above), the radial speed 232 for each observation can be used to determine how the distance between the ball 250 and the radar device (and thus the camera, e.g., when co-located with the radar device) increases for each new observation of the ball, in accordance with the following equation:

$$R_n = S_{n-1} + S_n * dt, \quad (1)$$

where $R_n$ is distance from radar at observation n, and $S_n$ is radial speed at observation n, and dt is the time between any pair of consecutive observations. $R_0$ is the distance between the ball and the radar before the ball is struck. $R_0$ is preferably determined before the ball is struck as it will typically be an input to the distance calculation for the first observation of the ball. There are several possible ways to determine or estimate this distance. For example, the distance between the camera and the golf ball can be manually measured and entered into the system before it is used.

Once the distance R between the radar/camera and the ball 250 is known at a given observation, e.g., using equation (1) and iterative processing in program 230, the 3D location of the ball 250 can be determined using the found radial distance 265 and details of the camera observation, such as by using the following linear algebra in the program 230:

$$Z_n = R_n * \cos(\theta_n), \quad (2)$$

$$X_n = Z_n * dx_n / f, \text{ and} \quad (3)$$

$$Y_n = Z_n * dy_n / f, \quad (4)$$

where n is the observation number, f is the focal length of camera optics (e.g., measured in pixels), θ is angle between camera sensor center and the location of ball impression on camera sensor, dx is the horizontal offset (e.g., in pixels) between ball location on the sensor and the sensor center, and dy is the vertical offset (e.g., in pixels) between the ball location on sensor and the sensor center. Note that $(X_n, Y_n, Z_n)$ describes the 3D location of the ball at observation number n, and thus the entire flight of the golf ball 250 can be described in 3D coordinates. In this example, the coordinate system will have its origin at the co-located radar and camera, the Z axis will point in the direction of the camera, the X axis will be horizontal left-to-right, and the Y axis will point downwards, perpendicular to the Z axis.

As will be appreciated, this coordinate system is derived from the pinhole camera model discussed above. In addition, in some implementations, a specific direction is chosen for the coordinate system that is different from the angle at which the camera is pointing. For instance, if the trajectory data is to be used by another system, such as a TV broadcast system, it is important to have established a common understanding of the direction of the coordinate system and how it relates to the real world. This can be accomplished using known coordinate transformation techniques. For example, a target object in the camera view can be agreed upon, and the direction of that target can then be used to define the "north" of the coordinate system. Rotating the coordinate system to match the selected target can involve determining the angle of the target relative to the center of the camera in both the horizontal and vertical planes, and then rotating the output data to compensate for those angles. The target angles can be readily derived from the pinhole camera model, provided the focal length of the camera system and the pixel size are known. For additional details regarding coordinate system transformations, see R. Hartley & A. Zisserman, Multiple View Geometry in Computer Vision, 2nd Edition, Cambridge University Press, March 2004.

Figure 3A:
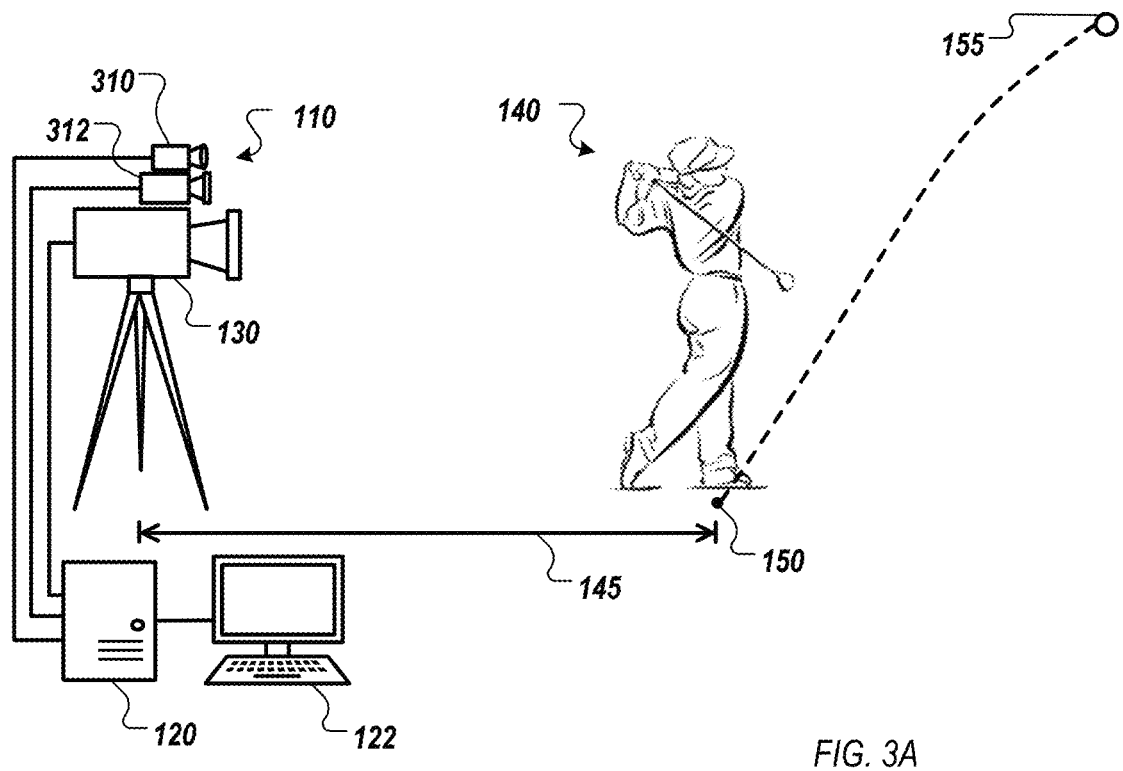
FIGS. 3A-3C show additional examples of system components that perform 3D tracking of a golf ball in flight.

Although the above example focuses on a co-located camera and radar, where the radar device only measures speed, other implementations are also possible. For example, FIG. 3A shows another example of a system, similar to that of FIG. 1A, but where a radar device 310 is separate from a camera 312 used for 2D tracking. When the radar device 310 and the camera 312 are not in the same spot, similar but slightly more complicated math is used to blend the radar and camera data, but using the same basic principles described herein. Note that both the camera 312 and the radar device 310 should be positioned so that they have a fair chance to capture a major portion of the ball flight. In practice, both sensors 310, 312 should be positioned in the vicinity of the golfer 140 and be aimed "down the line" of the golf shot.

When the radar device 310 and the camera 312 are not in the same location, their data can be combined as follows. The radar data is used to keep track of the distance R between the radar device 310 and the ball at each point in time. This information can be seen as a sphere in 3D with radius R, and the radar indicates that the ball is located somewhere on the surface of that sphere. Meanwhile, the camera 312 tracks the same ball and knows the angles (beta and gamma) for a straight line between the camera 312 and the ball for each point in time. If the locations in 3D space of both radar device 310 and the camera 312 are known, and the angle the camera 312 is directed is known, the 3D position of the ball can be found by using math to find the intersection between the sphere around the radar device 310 and the straight line between the camera 312 and the ball. In some cases, the line will intersect with the sphere twice, and heuristics can be used to determine which of the two intersections represent the true ball position.

Figure 3B:
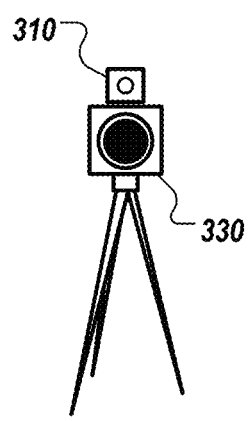
Figure 3C:
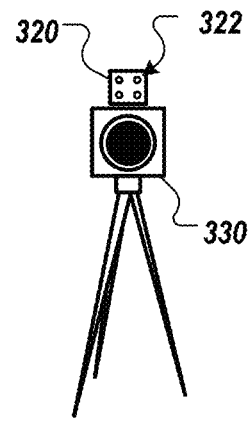

Further, note again that some implementations do not include the additional camera 130. Alternatively, the 2D tracking can be performed using the video data provided by the TV camera 130. FIG. 3B shows another example of a system, similar to that of FIG. 3A, but including only the radar device 310 and one camera 330, which corresponds to either the camera 130 or the camera 312 from FIG. 3A. Moreover, although the radar device 310 is represented in FIG. 3B as having only one radar antenna, in various implementations, the radar device will include one or more additional radar antennas. For example, FIG. 3C shows another example of a system, similar to that of FIGS. 3A and 3B, but including a radar device 320 that includes four radar antennas 322, which can provide enough angular resolution to aim the radar beams from the radar device 320. Note that in FIGS. 3B and 3C, the other components of the system are not shown, and the perspective is changed to look from the position of the golfer 140 back to the radar device 310, 320.

In some implementations, the radar device 310, 320 is a phased array radar sensor system. Using an array of radar antennas and software to control phase shift between the antennas, the transmitted radar signal can be aimed towards the target. Moreover, the distance and angular position of the target can be detected by measuring the phase shift of the returning signal as it hits the receiving antennas. While the angular resolution determined by measuring the phase shift will be good enough to aim the transmitted radar signal, it will still be beneficial to only use angular information from the camera data, in combination with radial distance information from the radar data, to determine the 3D positions of the target in space.

Figure 4:
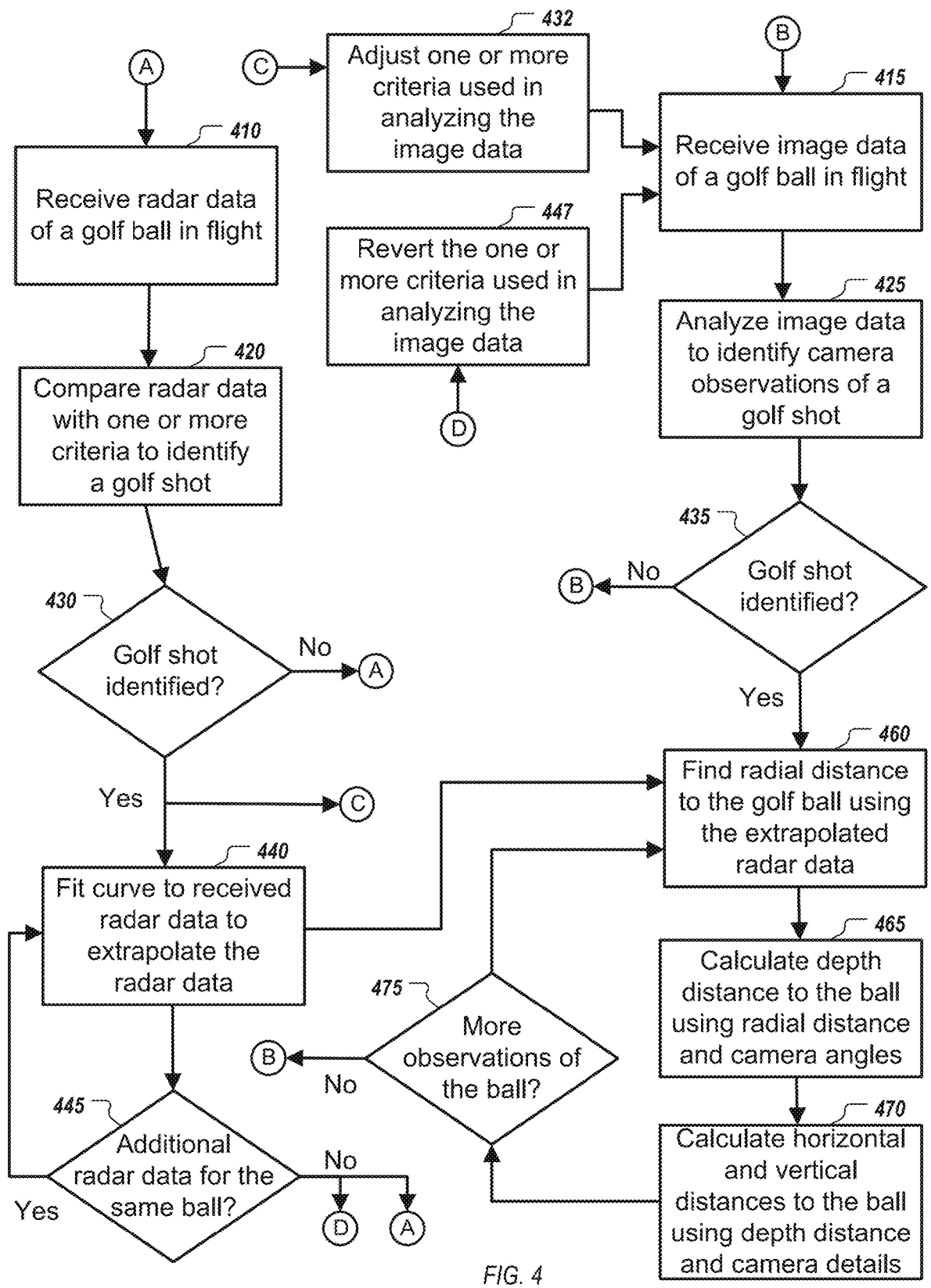
FIG. 4 is a flowchart showing an example of a process to perform 3D tracking of a golf ball in flight, as can be implemented in the systems of FIGS. 1A-3C.

FIG. 4 is a flowchart showing an example of a process to perform 3D tracking of a golf ball in flight, as can be implemented in the systems of FIGS. 1A-3C. Radar data of a golf ball in flight is received 410 (e.g., from the radar device 180). Concurrently therewith, 2D image data of the golf ball in flight is received 415 (e.g., from the camera 160); note that the received image data can also extend to and before the time when the ball is hit. The 2D image data is analyzed 425 to identify camera observations of a golf shot. For example, the streaming data 165 can be processed in real-time (e.g., using object classifiers) to identify various objects (e.g., a golfer and candidate balls) in the video stream, and a golf shot can be identified 435 when a series of candidate balls across a set of video frames meet or exceed one or more established criteria for a golf shot. In some implementations, the analyzing 425 involves automated adjustment of one or more thresholds (e.g., an optimized threshold per pixel) to maximize sensitivity for objects of interest (e.g., objects that look like golf balls) as well as real-time filtering to enable identification of a golf shot before all the 2D image data of the golf shot is received.

In addition, the radar data can be compared 420 with one or more criteria to identify a golf shot. For example, a ball speed criterion can be used such that a radar time series can only start in a certain speed range, which corresponds to the range of speeds that are likely for a golf ball that has just been hit (e.g., 100-250 miles per hour). Thus, distant golf shots flying at low speed, as well other objects, such as birds and planes, can be readily ignored. Additional criteria can be used across a series of radar measurements, as those measurements are received in real-time. For example, a radar measurements series of a golf shot should have decreasing speed over time, and this fact can be used to identify a golf shot in the radar data.

When a golf shot is identified 430 in the radar data, a signal can be sent to trigger an adjustment 432 of the one or more criteria used in analyzing the 2D image data. This will cause the analyzing 425 to favor selection of a set of object identifications that correspond to the golf shot, and thus increase the chances of identifying the golf shot at 435. Note that interaction between the processing of the radar data and the camera data can go both ways to improve the robustness of the shot detection. For example, in some implementations, the time of the first radar observation in a new radar series, and also the time of the first camera observation for a set of candidate balls will be noted. Since the camera and the radar are typically close to each other, and the direction the radar is aiming is known, the camera observations can be used to predict at what time the ball should have entered the area covered by the radar, and thus predict at what point in time the radar series for the golf shot should have begun. A threshold can then be set so that radar time series whose starting time deviate more than the threshold from the expected starting time, are ignored. By implementing more than one such cross-check of the data, the system can be made fairly robust on a driving range (or similar golf-themed entertainment facility) with multiple golfers. Moreover, the use of cross-checking on the data can help in identifying any latency issues between the radar data and the camera data, which should be synchronized to make sure time is accurately accounted for, e.g., using time stamps on the two data sets generated using a single common clock or two synchronized clocks.

In any case, once a golf shot is identified 430 in the radar data, a curve can be fit 440 to the received radar data to extrapolate the radar data to a continuous function of time for the golf shot. This allows a speed (or distance) to the golf ball to be readily found by simply plugging a time value of a camera observation of the ball into the continuous function. Furthermore, the receiving 410 and the curve fitting 440 can be performed concurrently, in real-time, and the curve fitting 440 can be updated 440 repeatedly while additional radar data is received and confirmed 445 as being for the same golf ball shot. Once no more radar data is received for the current golf shot, the process can revert 447 the one or more criteria (if changed) used in analyzing the 2D image data and also return to receiving 410 and comparing 420 radar data to identify a next golf shot.

In addition, for each in-flight camera observation of the golf shot, the radial distance to the golf ball is found 460 using the extrapolated radar data. For example, when the radar data includes distance data, the curve fitting 440 produces a continuous radial distance function, into which the appropriate time value can be input at 460. In other implementations, the radar data is speed data, and the curve fitting 440 produces a continuous radial speed function. This continuous radial speed function can be integrated between time to and time $t_n$ to get the radial distance at time to. As another example, as part of an iterative process, a speed value from the continuous function can be identified in accordance with the time of the camera observation, this speed value can be multiplied by a time value corresponding to a frame time of the camera frame rate to obtain a distance value, and this distance value can be added to a previously found radial distance of the golf ball.

It should be noted that the frame time of the camera frame rate is not always accurate for the time between the first in-flight camera observation of the golf shot and the time when the ball is actually hit since the camera may not capture an image of the ball at the exact time of impact by the club. In some implementations, this time difference is ignored, and highly accurate 3D tracking can still be achieved. In other implementations, this time difference is quantified and accounted for by determining a fraction of the frame time that represents the time between the first in-flight camera observation of the ball and the time of the club's impact with the ball (e.g., the fraction can be set equal to half the frame time, or the fraction can be set based on a comparison of the relative magnitudes of the first two radar speed measurements for the golf shot, or the fraction can be set based on the height of the ball in the first in-flight camera observation). This fraction of the frame time can then be used when determining the radial distance of the first in-flight camera observation of the ball, e.g., by multiplying the fraction of the frame time by the speed provided by the continuous speed function at the time of the first in-flight camera observation of the ball, and adding the result to the initial distance 145.

In some implementations, finding 460 the radial distance using the extrapolated radar data includes using different times than those that correspond exactly to the current camera observation. For example, identifying a speed value from the continuous speed function for each in-flight camera observation can involve using the continuous function and a time equal to a time of the current in-flight camera observation minus half of the frame time. As another example, identifying a speed value from the continuous speed function for each in-flight camera observation can involve retrieving two speed values using the continuous speed function, a first speed value corresponding to the time of the current in-flight camera observation, and a second speed value corresponding to the time of the immediately preceding in-flight camera observation, and these two speed values can then be averaged to generate the speed value for finding the radial distance to the ball.

In any case, for each in-flight camera observation of the golf shot, the radial distance to the golf ball is used to calculate 465 a depth (Z) distance to the ball based on a camera angle for the in-flight camera observation. This involves at least one trigonometric calculation of an angle between a camera reference location in the two dimensional image data and an identified location of the golf ball in the two dimensional image data, such as using equation (2) and the pinhole camera model above, e.g., when the camera and the radar are co-located in the same general position.

Further, for each in-flight camera observation of the golf shot, horizontal (X) and vertical (Y) distances to the ball are calculated 470 using the depth distance (Z) and details of the camera. This involves using linear algebra and camera observation details, including a horizontal offset between the camera reference location and the identified location of the golf ball, a vertical offset between the camera reference location and the identified location of the golf ball, and a focal length of the camera, such as using equations (3) and (4) above when the camera and the radar are co-located in the same general position.

This process of finding radial distances 460 and calculating 465, 470 3D locations of the golf ball in space using the radial distances and details of the camera observations continues while more observations of the ball are still available 475. Further, as with the radar data processing, the camera data processing can be performed in real-time, and the 3D locations of the golf ball can be calculated while the ball is actually in flight. Once no more camera data is received for the current golf shot, the process returns to receiving 415 and analyzing 425 camera image data to identify a next golf shot.

The description above focuses on the case of detecting and tracking golf shots occurring in series. However, in some implementations, the systems and techniques described are adapted to handle multiple balls being hit at the same time within the field of view of the camera. When two golf shots are hit almost simultaneously and from adjacent locations and in similar direction, it will be challenging for the system to accurately associate the radar ball speed with the correct optical track. To address this, the Doppler radar can be designed or programmed to only report one speed reading per measurement. It can be set to either report the speed of the object with the strongest radar signal, or the object with the fastest speed. However, neither is ideal for a range with multiple golf balls in the air at once, since at the second half of the ball flight, the measured ball may be neither the fastest nor the strongest reflecting object, and thus the radar might start reporting values for some other golf shot that is not the golf shot being tracked.

To address this issue, the radar device can be designed or programmed (e.g., by a mode setting) to report the speed of multiple objects with every measurement. So rather than picking the fastest speed (or strongest reflection) and sending that speed only, it can be set to report the speed of the three fastest objects, or the speed of the three objects with the strongest radar reflection. With such a mode of operation, some robustness to multiple balls in the air can be achieved with the following method: (1) identify the correct radar time series with the correlation in time method described above, (2) for each new set of radar measurements, try all three speeds against the speed projected by the model, and (3) if any of the reported speeds fall within some threshold distance of the projected ball speed in the existing radar time series model, the value is added to the series, the model is updated and then the system will await the next set of measurements.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the embodiment described above can be combined with any of the other features of the embodiment described above.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the description above focuses on tracking a golf ball shot, but the systems and techniques described are also applicable to other types of object flight tracking, such as for baseball or skeet shooting, as well as non-sports applications. In addition, the actions recited in the claims can be performed in a different order and still achieve desirable results.

What is claimed is:

1. A method comprising:
   obtaining two dimensional image data of a golf ball in flight, the two dimensional image data originating from a camera;
   obtaining radar data of the golf ball in flight, the radar data originating from a Doppler radar device;
   fitting a curve to the radar data to generate a continuous function of time for the radar data of the golf ball in flight;
   determining three dimensional location information of the golf ball in three dimensional space, the determining comprising, for each of multiple camera observations of the golf ball in the two dimensional image data,
      finding a radial distance to the golf ball using the continuous function and a time of the camera observation,
      finding a depth distance to the golf ball using the radial distance and an angle between a camera reference location in the two dimensional image data and an identified location of the golf ball in the two dimensional image data,
      finding a horizontal distance to the golf ball using the depth distance, a horizontal offset between the camera reference location and the identified location of the golf ball, and a focal length of the camera,
      finding a vertical distance to the golf ball using the depth distance, a vertical offset between the camera reference location and the identified location of the golf ball, and the focal length of the camera; and providing the three dimensional location information of the golf ball in three dimensional space to augment other data before display.

2. The method of claim 1, wherein the camera has a predetermined frame rate, the radar data comprises speed data but not distance data, and finding the radial distance comprises:
identifying a speed value from the continuous function in accordance with the time of the camera observation;
multiplying the speed value by a time value corresponding to a frame time of the predetermined frame rate to obtain a distance value; and
adding the distance value to a previously found radial distance of the golf ball.

3. The method of claim 2, wherein an initial radial distance to the golf ball is set in accordance with a predetermined starting point from which the golf ball is hit.

4. The method of claim 2, wherein finding the radial distance comprises determining an initial radial distance to the golf ball from a calculated distance to a golfer identified in the two dimensional image data from the camera.

5. The method of claim 2, wherein identifying a speed value from the continuous function for camera observations after a first observation comprises using the continuous function and a time equal to a time of a current camera observation minus half of the frame time.

6. The method of claim 2, wherein identifying a speed value from the continuous function for camera observations after a first observation comprises averaging a first speed value and a second speed value, the first speed value being calculated using the continuous function and a time of a current camera observation, and the second speed value being calculated using the continuous function and a time of a previous camera observation.

7. The method of claim 1, wherein obtaining the radar data and fitting the curve to the radar data are performed concurrently, fitting the curve comprises updating the curve fitting as more radar data of the golf ball in flight is received, and the providing comprises providing the three dimensional location information while the golf ball is still in flight.

8. The method of claim 7, comprising:
analyzing objects identified in the two dimensional image data to identify the camera observations of the golf ball;
comparing the radar data with a criterion to identify a golf shot;
signaling the golf shot being identified from the radar data; and
adjusting one or more criteria used in the analyzing to favor selection of a set of object identifications that correspond to the golf shot to identify the plurality of camera observations of the golf ball.

9. The method of claim 7, wherein the radar data includes radar time series data for two or more golf shots, and the method comprises:
predicting a beginning time point for a radar time series based on the camera observations; and
distinguishing between radar time series data for a first and a second of the two or more golf shots based on the predicted beginning time point.

10. The method of claim 9, wherein the distinguishing comprises:
comparing a speed value projected by the continuous function with different speed values in the more radar data received; and
adding one of the different speed values to a radar time series used for the updating when the one of the different speed values falls within a threshold of the speed value projected by the continuous function.

11. The method of claim 7, comprising using one or more cross-checks between the two dimensional image data and the radar data to improve robustness in an environment with multiple golfers, to identify latency issues, or both.

12. The method of claim 1, wherein the determining uses a direction for a coordinate system that is different from an angle at which the camera is pointing.

13. The method of claim 1, wherein providing the three dimensional location information of the golf ball in three dimensional space comprises generating a three dimensional representation of the golf ball in flight within a three dimensional computer model of an environment using the three dimensional location information.

14. A system comprising:
a camera configured to provide two dimensional image data;
a radar device configured to provide radar data;
a computer communicatively coupled with the camera and the radar device, the computer comprising a hardware processor and a memory coupled with the hardware processor, the memory encoding instructions configured to cause the hardware processor to
identify a golf ball in flight in the two dimensional image data,
fit a curve to the radar data to generate a continuous function of time for the radar data,
find radial distances to the golf ball using the continuous function and times of observations of the golf ball identified in the two dimensional image data,
find depth distances to the golf ball using the radial distances and angles between a camera reference location in the two dimensional image data and the observations of the golf ball identified in the two dimensional image data,
find horizontal distances to the golf ball using the depth distances, a focal length of the camera, and horizontal offsets between the camera reference location and the observations of the golf ball identified in the two dimensional image data,
find vertical distances to the golf ball using the depth distances, the focal length of the camera, and vertical offsets between the camera reference location and the observations of the golf ball identified in the two dimensional image data, and
provide three dimensional location information of the golf ball in three dimensional space to augment other data before display, the three dimensional location information corresponding to the depth distances, the horizontal distances and the vertical distances.

15. The system of claim 14, wherein the continuous function is a continuous radial speed function, and the instructions are configured to cause the hardware processor to integrate the continuous radial speed function over time to find the radial distances.

16. The system of claim 14, wherein the instructions are configured to cause the hardware processor to update the curve fit to the radar data as more radar data of the golf ball in flight is received, and to provide the three dimensional location information while the golf ball is still in flight.

17. The system of claim 16, wherein the instructions are configured to cause the hardware processor to:
compare the radar data with a criterion to identify a golf shot;
signal the golf shot being identified from the radar data; and adjust one or more criteria used to identify the golf ball in the two dimensional image data responsive to the golf shot being identified from the radar data.

18. The system of claim 16, wherein the radar data includes radar time series data for two or more golf shots, and the instructions are configured to cause the hardware processor to:
   predict a beginning time point for a radar time series based on the observations of the golf ball; and
   distinguish between radar time series data for a first and a second of the two or more golf shots based on the predicted beginning time point.

19. The system of claim 18, wherein the instructions are configured to cause the hardware processor to:
   compare a speed value projected by the continuous function with different speed values in the more radar data received; and
   add one of the different speed values to a radar time series used for the update of the curve when the one of the different speed values falls within a threshold of the speed value projected by the continuous function.

20. The system of claim 16, wherein the instructions are configured to cause the hardware processor to use one or more cross-checks between the two dimensional image data and the radar data to improve robustness in an environment with multiple golfers, to identify latency issues, or both.

21. The system of claim 14, wherein the camera and the radar device are co-located at a same location and are aligned with each other.

22. The system of claim 14, wherein the radar device is coupled with the camera to communicate radar readings to the camera.

23. The system of claim 14, wherein the camera is a television broadcast camera.

24. The system of claim 14, wherein the three dimensional space has a coordinate system that is not aligned with a direction the camera is pointing.

25. The system of claim 14, comprising a display device, and wherein the instructions are configured to cause the hardware processor to:
   generate a three dimensional representation of the golf ball in flight within a three dimensional computer model of an environment using the three dimensional location information; and
   present the three dimensional representation of the golf ball in flight within three dimensional computer model of the environment on the display device.

* * * * *